United States Patent [19]

Dausmann et al.

[11] Patent Number: 5,896,208
[45] Date of Patent: Apr. 20, 1999

[54] MASTER HOLOGRAM FOR THE PRODUCTION OF COPY-PROOF HOLOGRAMS

[75] Inventors: Guenther Dausmann, Erding; Klaus Gnaedig, Munich, both of Germany

[73] Assignee: Bundesdruckerei GmbH, Berlin, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/564,411

[22] Filed: Nov. 29, 1995

[30] Foreign Application Priority Data

Dec. 2, 1994 [DE] Germany ............... 44 43 029

[51] Int. Cl.$^6$ ............... G02B 5/32; G02B 27/44; G03H 1/14; G03H 1/20
[52] U.S. Cl. ............... 359/2; 359/11; 359/12; 359/15; 359/29
[58] Field of Search ............... 359/2, 10, 12, 359/29, 30, 31, 33, 15, 24, 22, 11

[56] References Cited

U.S. PATENT DOCUMENTS

| | | | |
|---|---|---|---|
| 3,639,032 | 2/1972 | Haines | 359/12 |
| 3,708,217 | 1/1973 | McMahon | 359/15 |
| 3,723,012 | 3/1973 | Storck et al. | 359/30 |
| 3,905,019 | 9/1975 | Aoki et al. | 359/20 |
| 4,014,602 | 3/1977 | Ruell | 359/2 |
| 4,563,024 | 1/1986 | Blyth | 359/2 |
| 4,839,250 | 6/1989 | Cowan | 359/22 |
| 4,960,314 | 10/1990 | Smith et al. | 359/15 |
| 5,026,132 | 6/1991 | Dausmann | 359/2 |
| 5,128,779 | 7/1992 | Mallik | 359/2 |
| 5,155,604 | 10/1992 | Miekka et al. | 359/2 |
| 5,296,949 | 3/1994 | Pennace | 359/2 |
| 5,396,559 | 3/1995 | McGrew | 283/86 |
| 5,471,327 | 11/1995 | Tedesco et al. | 359/30 |

FOREIGN PATENT DOCUMENTS

| | | | |
|---|---|---|---|
| 2245671 | 2/1987 | Germany | 359/10 |
| 6-110377 | 4/1994 | Japan | 359/2 |
| 2219248 | 6/1989 | United Kingdom | 359/12 |

*Primary Examiner*—Jon Henry
*Attorney, Agent, or Firm*—Dilworth & Barrese

[57] ABSTRACT

A method for the production of holograms proof against copying and imitation possessing authenticity features, which are copies of a master hologram. In accordance with the invention as a master hologram a hologram of a randomly structured optical element, as for example a diffusion plate, which constitutes the authenticity feature, is recorded and each hologram copy produced from the master hologram is provided with a layer having at least one layer with a color succession and/or the hologram copy produced on a thick light sensitive layer is caused to shrink or to expand.

10 Claims, 2 Drawing Sheets

FIG. 3A    FIG. 3B
FIG. 4
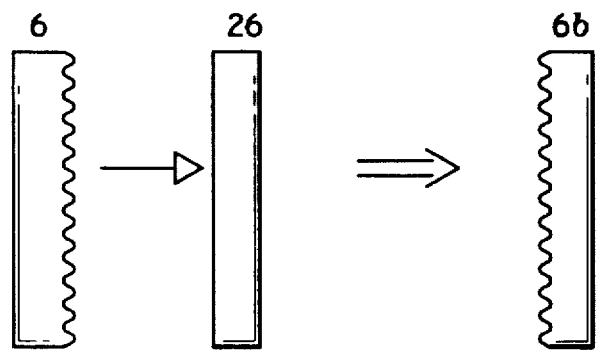
FIG. 5
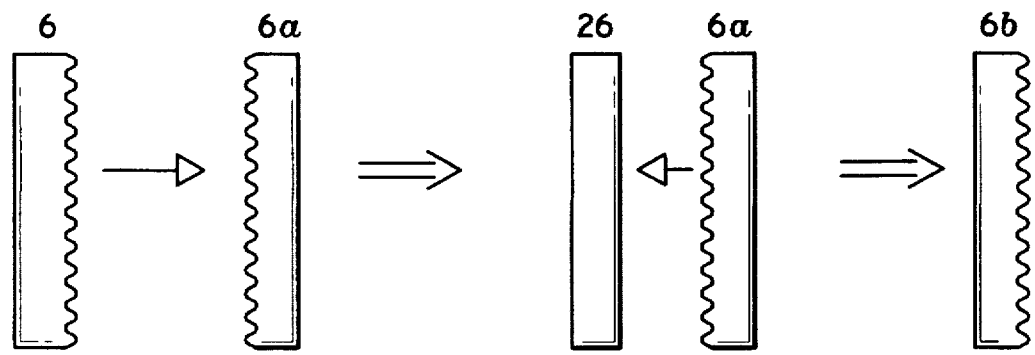

MASTER HOLOGRAM FOR THE PRODUCTION OF COPY-PROOF HOLOGRAMS

BACKGROUND OF THE INVENTION

The invention relates to a method for the production of copy-proof and imitation-proof holograms possessing authenticity features, which are copies of a master hologram.

Holograms, more particularly in the form of embossed holograms are being increasingly employed on identity documents and for vouching for the authenticity of goods coming from reputed manufacturers. The desired protective function can however only be ensured by holograms, if they can not be copied or imitated using non-holographic method by ingenious, resourceful forgers. It has been shown that presently conventional holograms employed as proofs of authenticity can be copied.

SUMMARY OF THE INVENTION

One object of the invention is consequently to provide a method of the type initially mentioned, using which copy-proof and imitation-proof holograms may be obtained capable of being employed as proofs of authenticity on articles and documents of all types.

In accordance with the invention such object is to be attained by the features of a method for the production of copy-proof and imitation-proof holograms possessing authenticity features, which are copies of a master hologram, characterized in that as a master hologram a hologram of a randomly structured optical element, as for example of a diffusion plate, which constitutes the authenticity feature, is recorded and in that each hologram copy produced from the master hologram is provided with a layer possessing at least one succession of colors and/or the hologram copy recorded on a thick light sensitive layer is caused to shrink or to expand.

Holograms suitable for use as a proof of authenticity must not only be proof against copying but also against imitation. Copy-proof here means that it is not to be possible for a forger to obtain an object, which is as similar as possible to the object recorded in the hologram serving as a proof of authenticity and then produce holograms from it, which then represent the imitated holograms.

The optical element with a random structure encoded in the master hologram, as for example a diffusing screen or a statistical phase-plate with a random distribution of the phase elements, may not be imitated by an artful forger, because to do this he would have to possess the optical element, which is best destroyed after it has been employed for recording the hologram, and which is however not available and furthermore owing to its random structures can not be produced afterwards either.

In any event, owing to the use of the master hologram, which is a holographic recording of a randomly structured optical element, imitation by reproduction is prevented.

The necessary impossibility of copying is achieved by the security hologram in accordance with the invention because the hologram copy produced from the master hologram is provided with layer having at least one succession of colors.

In lieu of using a layer having at least one layer with a succession of colors to render it copy-proof, the security of the security hologram may also be achieved if the master hologram, produced on a thick light-sensitive layer, is shrunk and/or caused to expand. Such shrinkage and/or expansion leads to color shifts in the hologram so that same may no longer be copied monochromatically.

Rendering the security hologram copy-proof by a layer possessing successions of colors and by shrinkage and/or expansion of the master hologram may naturally also be performed cumulatively.

It is convenient if for improving security against forgery during recording the security hologram a distorted reference beam is employed. Starting with the security holograms produced from the master hologram, it is practically impossible for a forger to reconstruct the identical master hologram, since for this purpose he would require the reference beam utilized during recording of the security holograms, which for example may be slightly distorted in a manner not able to be reproduced.

The security holograms in accordance with the invention may be recorded as reflection holograms or also as transmission holograms.

For the mass production of security holograms serving as a proof of authenticity an embossing stamp is obtained, for instance using known methods, from the master hologram and with same it is possible to emboss the security hologram, again using known methods, in aluminized or also transparent plastic layers.

Effective protection of such security holograms against copying is possible if same are embossed in a film having a succession of colors. The succession of colors is preferably to be incorporated in the embossing lacquer layer. The successions of colors should be produced in a plurality of areas as stripes, dots or graphic effects in at least two colors.

The term color successions is herein means stripes or patches in different colors, possibly produced in the form of control bars and possibly with a variation of the colors within a stripe or patch in wave length (color) or color density. As successions of colors it is possible to provide graphic effects, dots or furthermore patterns responsible for special effects. Graphic effects or patterns producing special effects may be represented in the succession of colors. Another or additional possibility is one in which the colors change with the angle of viewing the hologram, as for example is the case with colors of thin layers, which result from interference.

At least three colors should be present, complete transparency of the substrate layer counting as a color. If anything, a hologram rendered copy-proof in this manner could only copied using very sophisticated copying methods with dye lasers corresponding to the colors, it hardly being possible, even with skillful copying tests, to avoid differences in brightness in the copy; more particularly color boundaries would remain visible as lines. If the hologram were to be embossed on an identical or similar film provided with a color pattern, the result would be a hologram having a brightness line pattern superimposed on the color pattern.

It is particularly convenient if aperiodic wave line patterns of color lines are employed as colors patterns, wherein there is no line intersection. During copying the line pattern would be transferred to the copied product. On renewed embossing of the copy onto a substrate film with the same or a similar wave line pattern the result would be a hologram with intersections between color and brightness lines which could serve a means of recognizing a fake (having a moiré pattern). A moiré effect is produced, given a sufficiently fine line structure, owing to the superimposition of the different line structures of the film, color lines and hologram copy with the brightness lines, such moiré effect rendering a fake easy to detect. By the same token so-called "guilloche" line patterns as on banknotes and share certificates can be used here.

The color structures may be designed in the form of pictures, photographs, graphic effects or a dot pattern with a random distribution or in the form of writing. The color dots do not have to be drawn with sharp boundaries and indeed they may possess a gradual color transition.

Such color successions can be applied with the aid of thermal embossing films. For this purpose an embossing lacquer is applied to a substrate film using a separating adhesive layer. This embossing lacquer is provided with a vapor-deposited aluminum layer. The hologram relief is then embossed in such layer using the embossing stamp produced from the master hologram. A hot melt adhesive layer (sizing/priming) is then applied to such embossed layer with the relief. Together with a printing stamp the compound so formed is pressed onto a substrate layer of paper or of plastic film. This substrate layer may for example be the document to be validated i.e. whose authenticity is to be proved. Such pressing on is also performed while hot so that separation at the adhesive separation layer occurs. The priming layer then provides the connection with the substrate layer, the separating adhesive layer being released by the action of heat so that the embossing lacquer layer constitutes the external layer.

The color successions may be already incorporated in the embossing lacquer layer beforehand. It is naturally also possible to apply a further layer with the color succession. All layers may be transparent.

The hologram relief may also be embossed on a non-vapor coated plastic film, a reflection hologram being produced owing to the different indices of refraction of the layers joined together.

As an alternative it is possible for an extremely thin aluminum layer to be applied to a plastic film, which then partially remains transparent.

Mass production of thick holograms from master holograms may for example take place by contact copying with a scan exposure process in a known manner.

The identical holograms mass produced from the master hologram are protected against copying by the embossing of the hologram in transparent films provided with different color areas or using a photographic exposure method for the hologram and following shrinkage and expansion. However such protection will not in principle be sufficient to avoid copying of the hologram by cunning forgers. For this reason the hologram is also protected by coding, using the hologram of a randomly structured optical element, as for example a diffusion plate.

Since consequently the holograms mass produced from the master hologram incorporate encoded hologram information, special reading devices must be created with which such holograms may be recognized as being authentic. Such a reading device for examining the authenticity of hologram copies produced from the master hologram is characterized in accordance with the invention in that in a predetermined optical arrangement with a laser, preferably a laser diode, a hologram of the master hologram is produced using a reference beam, which may contain readable information, and in that the reading device has the very same optical arrangement as employed during recording, the hologram copy to be examined being placed in the position of the master hologram. In the reading device the hologram of the master hologram consequently constitutes the decoding hologram for examination of the authenticity of the hologram copies to be checked. If in the reading device the hologram to be checked is exposed using the reference beam also employed for recording the decoding hologram, then from the hologram to be checked an object beam will be reconstructed containing the hologram information and which from the decoding hologram, if the hologram to be checked is authentic, will reconstruct the reference beam employed during recording. This reference beam may be a continuous or even wave or however it may also contain readable information. Such reference beam may be automatically checked for authenticity by a light sensitive optical element.

The particular feature of the reading device in accordance with the invention is that the master hologram or, respectively, the authentic holograms produced from it, can not be derived from the decoding hologram in the reading device. Since, even in the case of selection of the right reference, the decoding hologram will possess the tolerances and unique features of the individually produced reading device, it would be only be possible, if anything, using the reading device, to produce and copy hologram which possesses the individual features of the unique reading device. Only if very great skill is employed could such a hologram copied from the decoding hologram produce a functioning hologram in the reading device, in which it has been copied, but not in other reading devices, which possess other unique departures due to manufacture and tolerances.

Reconstruction of the master hologram from the decoding hologram is rendered extremely difficult or impossible not only because of the distortion caused by the unique reading device, but also because any forger would employ the read beam of the reading device as a reference beam for re-copying.

In accordance with a further development of the invention there is a provision such that on recording the decoding hologram "in situ" in the reading device the copy of the master hologram is produced using a fourier lens in the fourier plane. The use of a known fourier optical system offers the advantage that the image of the hologram is formed by parallel beams at infinity. This arrangement renders it possible, on insertion of the hologram to be examined, to make adjustments in the X and Y directions without the hologram reconstruction being adversely affected, since owing to high redundancy each dot, for reconstruction of the associated local frequencies, coincides with the corresponding grating structures of the hologram and there is a reconstruction of the hologram. However the hologram to be checked must be inserted in the correct rotational setting. Such setting may be simply detected by slowly rotating the hologram during examination so that it will some time arrive in the correct angular position, this being indicated by a sudden increase in brightness of the reference beam indicating authenticity and reconstructed from the decoding hologram.

An additional way being certain that the master hologram may not be reconstructed from the decoding hologram of the reading device is by skewing the decoding hologram in each reading device by a different angle.

BRIEF DESCRIPTION OF THE DRAWINGS

One embodiment of the invention will now be described in the following with reference to the accompanying drawing, in which:

FIGS. 3(a) and 3(b) are schematic illustrations of holograms possessing a succession of colors, FIG. 4 is a schematic illustration of a master hologram directly embossed into a plastic layer, and FIG. 5 is a schematic illustration of production of a hologram copy from an embossing stamp.

DESCRIPTION OF THE PREFERRED EMBODIMENTS

Figure 1:
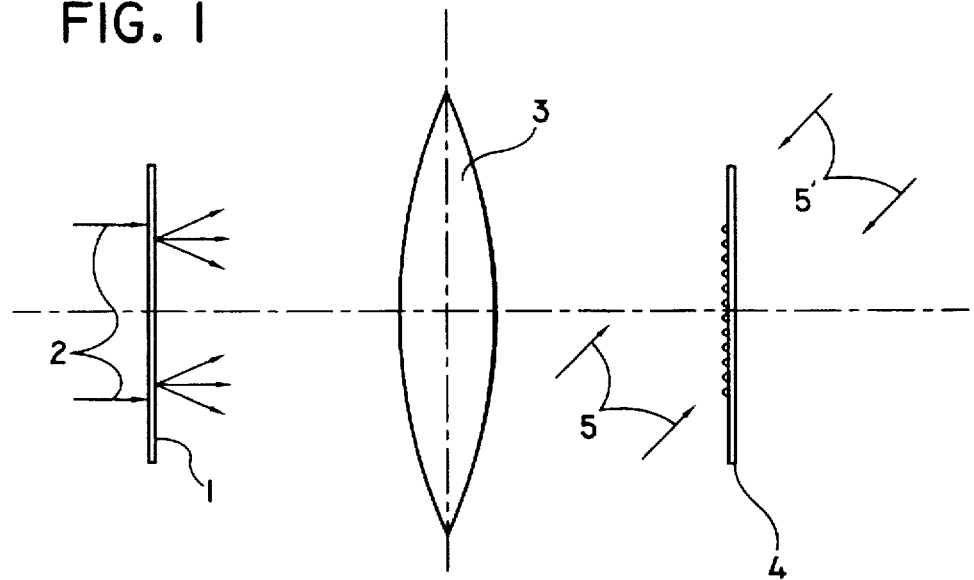
FIG. 1 shows an arrangement for recording a master hologram with hologram information encoded therein and consisting of a randomly structured optical element in a diagrammatic elevation.

FIG. 1 diagrammatically shows the recording of a master hologram, wherein the random structure of the diffusion plate 1 as an object is encoded. The diffusion plate 1 has an object beam 2, coming from a laser, shining through it. Using the image forming optical system 3, which comprises a known fourier optical system, the mutually parallel object beams (for image formation at infinity) in the hologram plane 4 are brought together with a reference beam 5 which is distorted or furthermore which may be reproduced as required, to cause interference so that the master hologram is produced on the photographic material 6 arranged in the hologram plane 4. Dependent on which side the reference beam is incident on the hologram plane, a reflection hologram or a transmission hologram will be produced. If a thick hologram, which is subsequently to be caused to shrink or expand is to be produced, such hologram is preferably produced in the form of a reflection hologram with the reference beam 5.

Then using conventional mass copying methods holograms serving as a proof of authenticity are then made from the master hologram 6.

Figure 2:
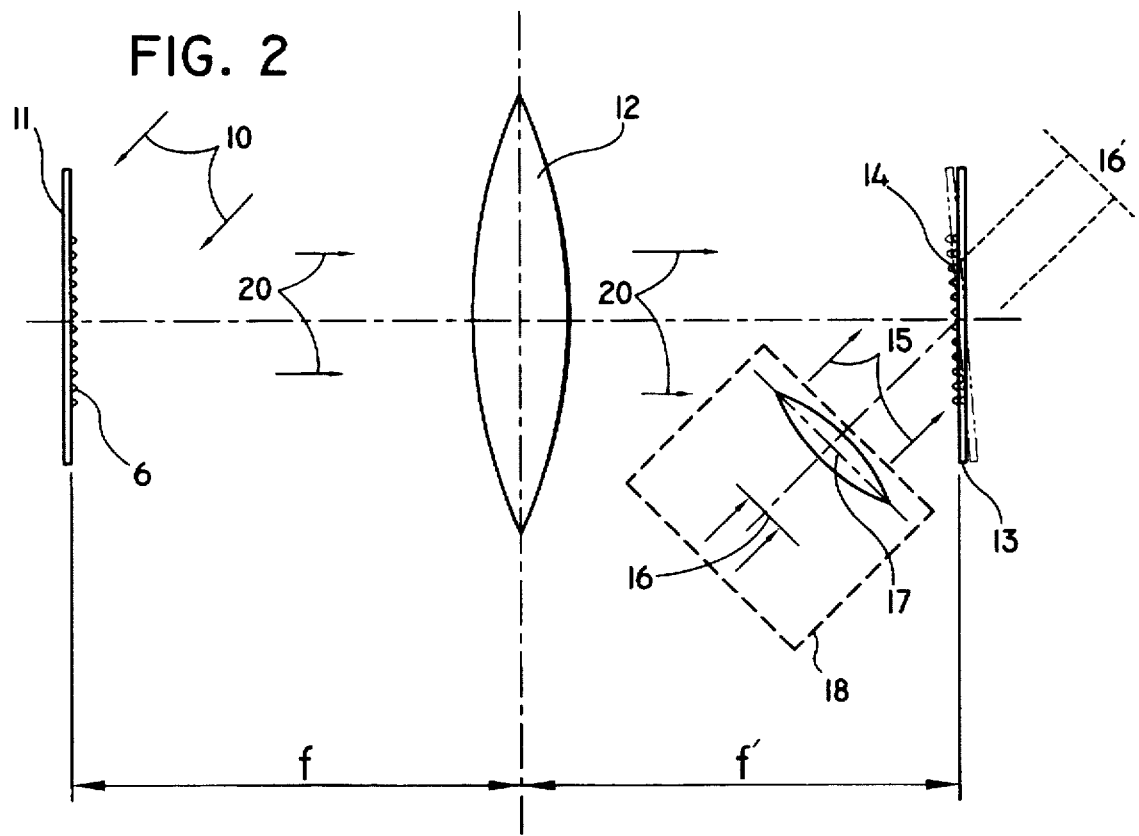
FIG. 2 shows an arrangement for the production of a reading device in a diagrammatic view.

Using the master hologram or a copy of the master hologram the reading device is then produced with the aid of the arrangement illustrated in FIG. 2. Such reading device possesses a laser light source, preferably a laser diode, from which the reference beam 10 comes, with which a hologram is reconstructed from the master hologram 6 placed in the checking plane 11, the reconstructed object wave 20 being projected by the image forming optical system 12, which also comprises a fourier optical system, in the hologram plane 13, in which plane the reconstructed object wave 20 is caused to interfere with a reference beam 15 from the laser, such beam 15 possibly containing additional information which is projected as image 16' using the image forming optical system 17 as image 16. It is in this manner that in the hologram plane 13 a decoding hologram 14 is produced "in situ", which remains at the same position in the unique reading device. The decoding hologram is hence not identical to the master hologram 6, since same has not been reconstructed with the reference beam 15 but with a reading device-related beam 10 and furthermore represents the previously transformed object wave 20. If now in the reading device produced in this manner the hologram to be examined is placed in the object plane 11, it is possible to reconstruct beam 15. In order to achieve this reconstruction of beam 15, the hologram placed in plane 11 is irradiated by reference beam 10. By interaction of reference beam 10 with the hologram in plane 11, object beam 20 is reconstructed and projected onto the decoding hologram 14 via the optical system 12. By interaction of the object beam 20 with decoding hologram 14, the reference beam 15 will be exactly reconstructed so that the information recorded therein will be visible as a sign of authenticity and may also be machine-processed.

In FIG. 4, a master hologram 6 is directly embossed into a plastic layer 26, whereby a hologram copy 6b is produced. In FIG. 5, an embossing stamp 6a is first produced from the hologram master in a known way. Then, embossing stamp 6a is embossed into a plastic layer 26, thereby producing a hologram copy 6b, i.e., recording the hologram copy in the plastic layer.

We claim:

1. A method for the production of copy-proof and imitation-proof holograms possessing authenticity features and which are copies of a master hologram, comprising the steps of
   (1) recording a master hologram with
      (i) a hologram of a randomly structured optical element which is a statistical phase plate containing a random distribution of phase elements and constitutes the authenticity feature, and
      (ii) a distorted reference beam containing readable information,
   (2) preparing copies of the master hologram, and at least one of the following steps (3) and (4):
   (3) providing each hologram copy produced from the master hologram with a layer possessing at least one succession of colors;
   (4) recording the hologram copy on a thick light sensitive layer and causing the hologram copy to shrink or expand.

2. The method as claimed in claim 1, comprising the steps of
   producing an embossing stamp from the master hologram, the embossing stamp constituting a hologram relief, and
   embossing the embossing stamp on a transparent plastic layer,
   thereby transferring the hologram relief on the embossing stamp onto the transparent plastic layer.

3. The method as claimed in claim 2, wherein the plastic layer comprises at least one of the following features (i) and (ii):
   (i) a plurality of areas with at least two colors;
   (ii) stripes with at least two colors.

4. The method as claimed in claim 3, wherein the plastic layer is provided with at least one pattern consisting of color lines.

5. The method as claimed in claim 4, wherein the plastic layer is provided with a wave line pattern, whose lines are free of intersection.

6. The method as claimed in claim 2, comprising the step of producing coloration of the plastic layer by the interference of thin layers.

7. The method of claim 1, wherein the step of (1) recording the master hologram, comprises the steps of:
   (a) passing an object beam (2) through the randomly structured optical element (1);
   (b) distorting the reference beam (5) to contain the readable information; and
   (c) bringing the hologram passing through the randomly structured optical element (1) together with the distorted reference beam (5) to cause interference and produce the master hologram on photographic material (6) arranged in a resultant hologram plane (4).

8. The method of claim 7, wherein the randomly structured optical element (1) is a diffusion plate, and comprising the additional steps of
   generating the object beam (2) from a laser, and
   utilizing an imaging-forming fourier optical system (3) to bring mutually parallel object beams (2) passing from the diffusion plate (1) together with the distorted reference beam (5).

9. The method of claim 1, wherein the succession of colors is constituted by stripes or patches in different colors, with variation in color wavelength or density in each stripe or patch.

10. The method of claim 9, wherein control bars are produced.

* * * * *